E. OHNSTRAND.

FILING DRAWER OR RECEPTACLE.

2 SHEETS—SHEET 1.

Reissued Nov. 28, 1916.

APPLICATION FILED OCT. 23, 1916.

14,220.

Inventor

Witnesses

Ada M. Whitmore

Frances Jacobsohn

Enoch Ohnstrand

By H. H. Simms

Attorney

THE NORRIS PETERS CO., PHOTO-LITHO., WASHINGTON, D. C.

E. OHNSTRAND.

FILING DRAWER OR RECEPTACLE.

Reissued Nov. 28, 1916.

APPLICATION FILED OCT. 23, 1916.

2 SHEETS—SHEET 2.

14,220.

Witnesses

Ada M. Whitmore

Frances Jankowitz

Inventor

Enoch Ohnstrand

By H. H. Simms his Attorney

THE NORRIS PETERS CO., PHOTO LITHO., WASHINGTON, D. C.

UNITED STATES PATENT OFFICE.

ENOCH OHNSTRAND, OF SYRACUSE, NEW YORK, ASSIGNOR TO U. S. STEEL FURNITURE COMPANY, OF SYRACUSE, NEW YORK, A CORPORATION OF NEW YORK.

FILING DRAWER OR RECEPTACLE.

14,220. Specification of Reissued Letters Patent. Reissued Nov. 28, 1916.

Original application filed September 22, 1913, Serial No. 791,072. Renewed March 7, 1916, Serial No. 82,744. Original No. 1,200,517, dated October 10, 1916. Application for reissue filed October 23, 1916. Serial No. 127,828.

*To all whom it may concern:*

Be it known that I, ENOCH OHNSTRAND, of Syracuse, in the county of Onondaga and State of New York, have invented a new and useful Improvement in Filing Drawers or Receptacles, which improvement is fully set forth in the following specification and shown in the accompanying drawings.

The present invention relates to filing drawers or receptacles and partitioning means therefor, an object of the invention being to provide an adjustable partition or follower which may be held in various positions within the drawer or receptacle for the purpose of forming compartments of different sizes.

Another object of the invention is to provide a partitioning means which may be inserted within furniture drawers without the formation of any parts on the body of the drawer.

To these and other ends the invention consists in certain parts and combinations of parts all of which will be hereinafter described, the novel features being pointed out in the appended claims.

Figure 1:
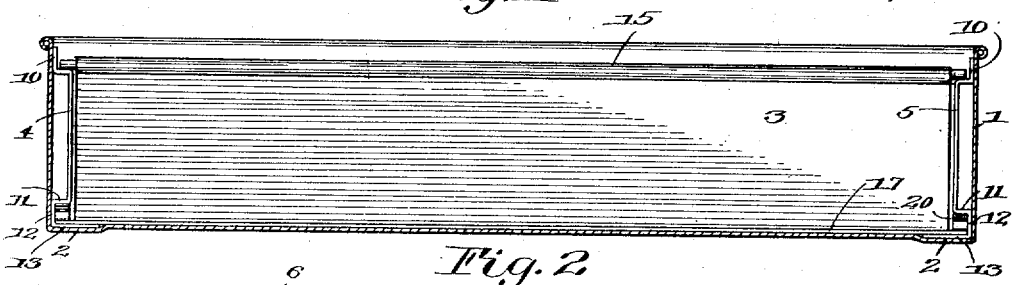
Figure 2:
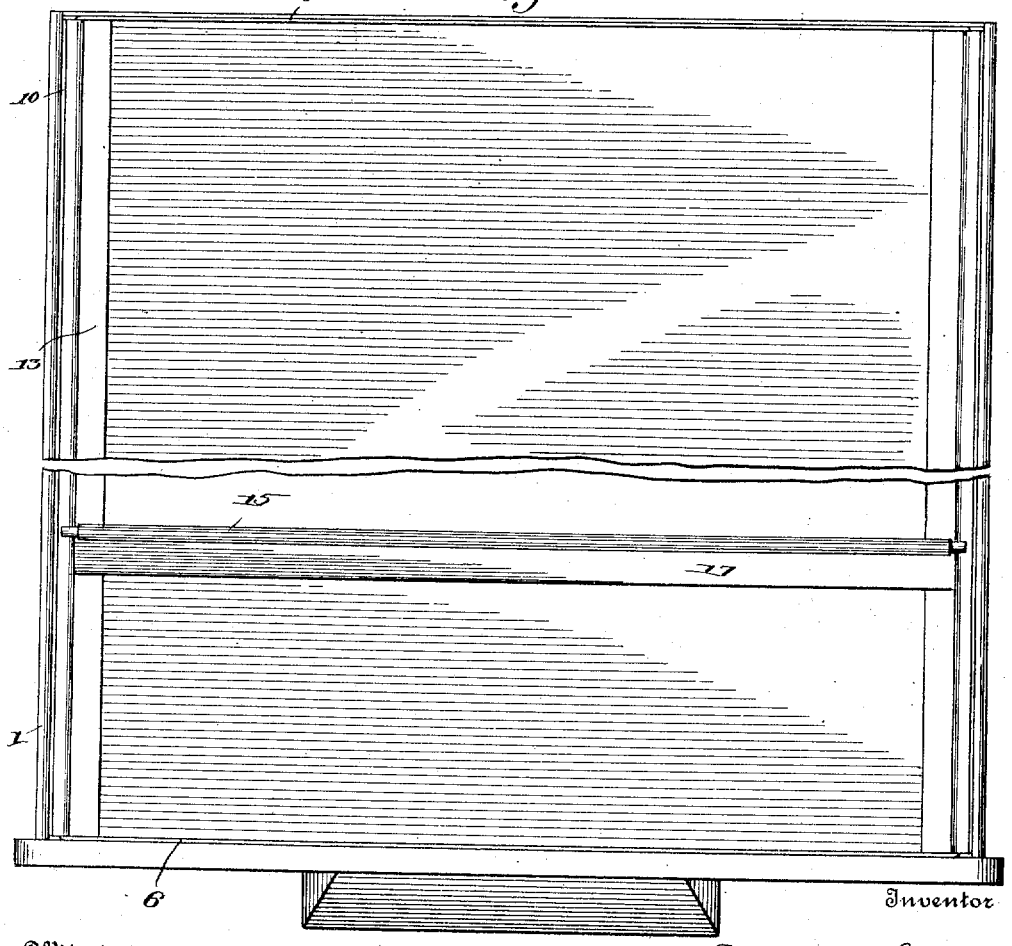
Figure 3:
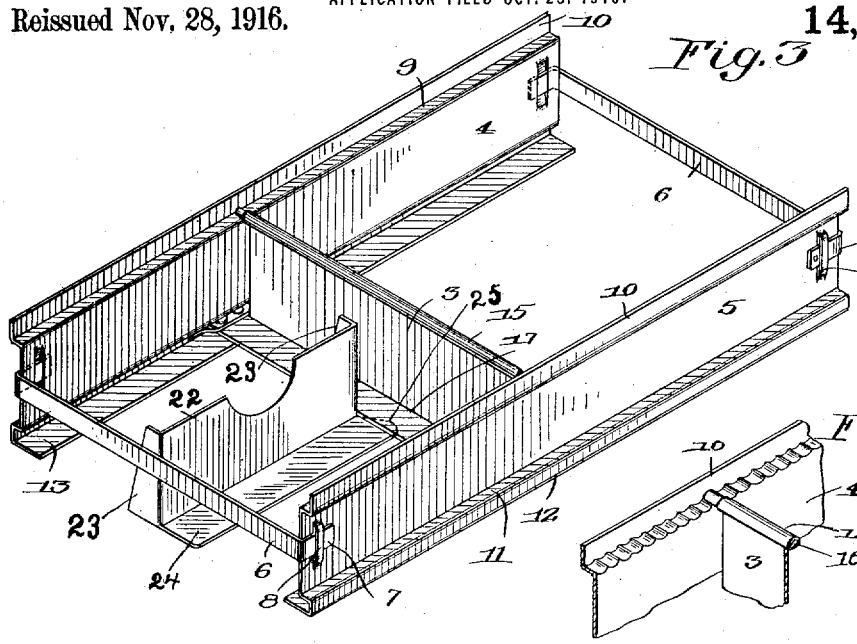
Figure 4:
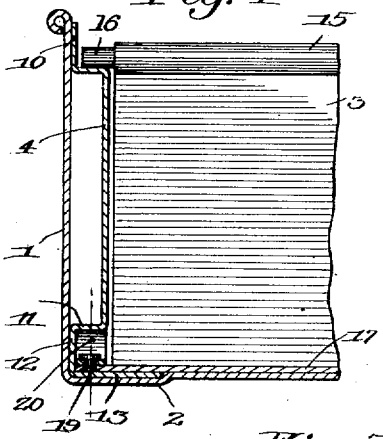
Figure 5:
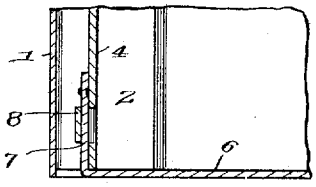
Figure 6:
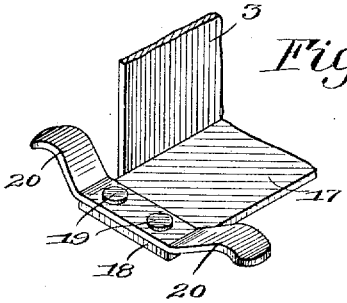
Figure 7:
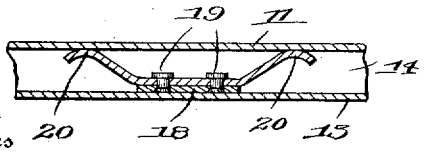

In the drawings: Figure 1 is a transverse sectional view through the drawer with the partitioning means therein; Fig. 2 is a plan view of the drawer or receptacle embodying the present invention; Fig. 3 is a perspective view of the partitioning means; Fig. 4 is an enlarged detail view showing the coöperation between one end of the partition or follower and the guide member; Fig. 5 is a detail view showing the manner of connecting the two guide strips; Fig. 6 is a detail view showing the spring on one end of the partition or follower; Fig. 7 is a detail sectional view showing the coöperation of the spring with one of the channels in the guide member; and Fig. 8 is a detail view showing a modification in which the upwardly presented guide face is corrugated.

According to the present invention, there is provided a receptacle or drawer 1 preferably made from sheet material and, having along opposite sides of its bottom, depressed portions 2 which, in the use of the drawer, serve to coöperate with the drawer guides for the purpose of reducing friction on the bottom of the drawer. The partitioning means is preferably separate from the drawer so as to be readily attached or detached therefrom. In the present instance, the partitioning means embodies a partition 3 and a guide member or frame. The latter preferably comprises two sheet metal strips 4 and 5 vertically arranged and connected together at their ends to be held in spaced and parallel relation by tie pieces 6 in the form of metal strips turned laterally at 7 at their ends and passed through loops 8 struck up from the metal of the sheet metal guide strips 4 and 5 on the outer faces of the latter. Each of the guide strips 4 and 5 has an upwardly presented guide surface 9 formed by bending the sheet metal guide strip outwardly from its body portion, an upwardly extending flange 10 being arranged at the outer edge of the guide portion 9 for the purpose of strengthening the latter and providing a flat face for coöperation with the inner face of the drawer or receptacle. Preferably below the upwardly presented guide face 9, each guide piece 4 and 5 is provided with a downwardly presented face 11 formed by bending the sheet metal strip outwardly. From the outwardly presented portion 11, the sheet metal guide strip is bent downwardly at 12 parallel with the guide strip 10 and thence inwardly at 13 to provide a channel 14 on the inner face of the guide strip. The width of the inwardly-turned portion 13 is slightly less than the width of the depressed portion 2, and the thickness of the inwardly-turned portion 13 is substantially equal to the depth of the depression 2, so that the inwardly-turned portion 13 may rest within one of the depressions 2 in order that its upper face will lie flush with the upper face of the drawer bottom between the two depressions. The partition 3, before mentioned, is also preferably formed from sheet metal with the main portion thereof arranged vertically. The upper edge of this main or body portion is rolled at 15, and extending longitudinally through the roll is a rod 16 which projects at its ends beyond the partition 3 to provide two projections which engage with the upwardly-presented guide face 9. The lower edge of the partition 3 is turned forwardly at 17, and this forwardly projecting portion has its ends 18 forming two projections beyond the ends of the partition 3 and extending into the channels 14 in the guide pieces 4 and 5, the under surface of these projections 18 normally resting upon the upper surface of the flanges 13 while the under surface of the bottom flange 17 of the partition 3 rests upon that portion of the bottom of the drawer or receptacle between the depressed portions 2.

The partition 3 at its ends may carry spring means which tends to hold the projections 18 in engagement with the flanges 13 and the projections formed by the ends of the rod 16 in engagement with the upwardly presented guide faces 9. In this instance, these springs are in the form of two strips of metal, each riveted at 19 to the upper face of one of the projections 18 and having its ends 20 bent or deflected to provide oppositely extending spring arms for coöperation with the downwardly presented face 11 or, in other words, with the upper walls of the channels 14.

Figure 8:
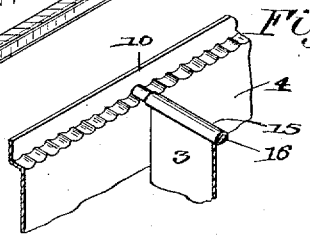

In the embodiment of the invention shown in Fig. 8, the upwardly presented guide face 9 is corrugated transversely at 21 throughout its length in order to provide recesses or notches for the reception of the projection formed by the end of the rod 16 at the upper portions of the partitions 3. This arrangement prevents the accidental slipping of the partition or follower. If desired, a second follower or partition may be provided for still further dividing the drawer. This is shown in Fig. 3 and comprises an upright wall 22 having laterally-turned flanges 23 along its vertical edges and a laterally-turned flange 24 along its lower edge extending in a direction opposite to that in which the flanges 23 extend. One end of the flange 24 is extended at 25 so as to project beneath the bottom of the partition 3 to hold the follower or partition 3 against tilting. The flanges 23 hold the partition or follower 22 against turning sidewise.

To insert the partitioning means within a drawer, or other receptacle, the parts are connected as shown in Fig. 3 and introduced into the drawer so that the portions 10 and 12 coöperate with the inner faces of the side walls of the drawer while the strips 6 coöperate with the front and rear walls of the drawer and hold the guide strips 4 and 5 in parallel relation. When in the drawer, the strips 6 cannot become detached from the guide strips. After the parts have been thus adjusted, the partition 3 may be shifted longitudinally of the guide member or frame to provide two compartments, either one of which may be of the desired size. The spring 20 acts to draw the projections 16 and 18 firmly against the faces with which these projections normally engage, and the bottom of the partition or flange 17 is firmly held against the upper face of the drawer bottom so that the passage of papers beneath the partition is prevented. The partitioning means is especially designed for insertion within a drawer which does not have grooves in the walls thereof. The method of connecting the partitioning means with the drawer is strong and durable and not liable to get out of order, and the adjustment can be readily effected.

What I claim as my invention and desire to secure by Letters Patent is:

1. A partitioning means comprising two parallel guide members, a partition adjustable on said guide members, and tie pieces connecting the ends of the guide members and holding them in parallel relation.

2. A partitioning means comprising two parallel guide members, a partition guided at its ends on the guide members, loops provided on the outer faces of the guide members near the ends thereof, and tie pieces having laterally-turned ends, said tie pieces connecting the guide pieces to hold the latter parallel and having the laterally-turned ends extending about the ends of the guide pieces through the loops.

3. The combination with a pair of guide pieces each having an upwardly-presented face and a downwardly-presented face, of a partition having two projections at each end, one projection coöperating with the upwardly-presented face on a guide piece and the other projection coöperating with the downwardly-presented face on the same piece, and one of the projections having a spring between it and the face with which it coöperates.

4. The combination with a pair of guide pieces, each formed from a strip of sheet metal vertically arranged and bent to provide an upwardly-presented face and a downwardly-presented face, of a partition formed from sheet metal having a rolled portion at its upper edge and a flange at its lower edge, a rod extending through the rolled portion and projecting at its ends to coöperate with the upwardly-extending faces on the guide pieces, and springs carried by the projecting ends of the bottom flange of the partition and coöperating with the downwardly-presented faces on the guide pieces.

5. The combination with a receptacle, and an upwardly and a downwardly-presented guide face arranged along each side of the receptacle, of a partition formed from sheet metal rolled at its upper edge and turned laterally at its lower edge, the laterally-turned portion projecting at its ends beneath the downwardly-presented guide faces, a rod extending through the rolled portion at the upper edge of the partition and coöperating with the upwardly presented guide faces, and spring arms carried by the projecting portions of the laterally-turned flange at the bottom of the partition, said arms bearing against the downwardly-turned guide faces.

6. The combination with a pair of guide pieces, each formed from sheet metal and provided with a channel, of a partition carrying springs at its ends coöperating with the upper walls of the channels.

7. The combination with two guide pieces, each formed from sheet metal and having its upper portion bent outwardly and upwardly and its lower portion bent outwardly, downwardly and inwardly to provide a channel, of a partition formed from sheet metal and having projections at its ends and near its upper edge to coöperate with the upper outwardly-turned portions of the guide pieces, said partition also having projections at its ends and near its bottom to extend into the channels, and springs carried by the last-named projections for coöperating with the upper walls of the channels.

8. The combination with two guide pieces formed from sheet metal, and tie pieces connecting the ends of the guide pieces to hold them in parallel relation, each guide piece being bent outwardly near its upper edge and outwardly near its lower edge, of a partition having projections at its ends and near its upper edge to coöperate with the upper outwardly-turned portion, and oppositely extending arms carried at the ends of the partitions and near the bottom of the latter to coöperate with the outwardly-turned portions near the lower edges of the guide pieces.

9. The combination with a receptacle having depressed portions in its bottom and near opposite side walls thereof, of two guide pieces each formed from a sheet metal strip bent outwardly near its upper edge and bent outwardly near its lower edge, thence downwardly and thence inwardly, the inwardly-turned portion resting in one of the depressions of the drawer bottom, of a partition having portions at its ends and near its upper edge to coöperate with the upper outwardly-turned portions of the guide pieces, and springs at its ends and near its bottom to coöperate with the outwardly-turned portions near the lower edges of the guide pieces.

10. The combination with a pair of guide pieces, each having a corrugated upwardly-presented face and a downwardly-presented face, of a partition having a projection at each end for coöperation with the corrugated faces, and springs carried by the partition for coöperation with the downwardly-presented faces.

11. A follower formed from sheet metal and having two vertical flanges projecting rearwardly from its opposite vertical edges, and a horizontal flange projecting forwardly from its lower edge, the horizontal flange being provided with a projection beyond one of the vertical flanges.

12. The combination with a receptacle having upwardly and downwardly-presented surfaces extending in parallel relations along opposite sides thereof, of a follower coöperating with the upwardly-presented surfaces to be guided by the latter, and a pair of oppositely extending spring arms at opposite ends of the follower for coöperating with the downwardly-presented surfaces to hold the follower against the upwardly presented surfaces.

13. The combination with a receptacle having channels extending along opposite sides thereof, of a follower arranged in the receptacle and having a laterally-turned portion at its lower edge provided with extensions projecting into the channels, and spring arms carried by said extensions and coöperating with the top walls of the channels.

14. The combination with a receptacle having downwardly-presented guide faces along opposite sides thereof, of a follower arranged in said receptacle and having portions carrying oppositely-extending spring arms for coöperating with the downwardly-presented faces to hold the follower against the bottom of the receptacle.

ENOCH OHNSTRAND.

Witnesses:
HAROLD H. SIMMS,
ABERTH E. OHNSTRAND.

Copies of this patent may be obtained for five cents each, by addressing the "Commissioner of Patents, Washington, D. C."